United States Patent [19]

Watanabe

[11] Patent Number: 4,542,910
[45] Date of Patent: Sep. 24, 1985

[54] MOTORCYCLE SUSPENSION SYSTEM

[75] Inventor: Masae Watanabe, Iwata, Japan

[73] Assignee: Yamaha Hatsudoki Kabushiki Kaisha, Japan

[21] Appl. No.: 460,768

[22] Filed: Jan. 25, 1983

[30] Foreign Application Priority Data

Jan. 25, 1982 [JP] Japan .................................. 57-10459
Sep. 20, 1982 [JP] Japan ................................. 57-162232

[51] Int. Cl.$^4$ ............................................ B62K 21/02
[52] U.S. Cl. ..................................... 280/276; 280/279
[58] Field of Search ............... 280/276, 666, 279, 256, 280/233, 690, 790, 277, 264

[56] References Cited

U.S. PATENT DOCUMENTS

| 426,402 | 4/1890 | Torkelson | 280/264 |
|---|---|---|---|
| 946,143 | 1/1910 | Levedahl | 280/276 |
| 2,463,310 | 3/1949 | Probst | 180/233 |
| 3,630,303 | 12/1971 | Froumajou | 180/256 |
| 4,212,481 | 7/1980 | Ribi | 280/276 |
| 4,379,567 | 4/1983 | Ribi | 280/276 |
| 4,410,196 | 10/1983 | Ribi | 280/276 |
| 4,422,662 | 12/1983 | Inoue et al. | 280/276 |

FOREIGN PATENT DOCUMENTS

| 55-46093 | 3/1980 | Japan . |
| 56-160186 | 11/1981 | Japan . |
| 57-26988 | 6/1982 | Japan . |
| 57-155177 | 9/1982 | Japan . |

OTHER PUBLICATIONS

Radmarkt publication, Nov. 19, 1976, p. 82.

Primary Examiner—Richard A. Bertsch
Attorney, Agent, or Firm—Ernest A. Beutler

[57] ABSTRACT

Two embodiments of motorcycle suspension systems that are particularly adapted for use with the steered front wheel. Each embodiment achieves a non-linear suspension rate through the use of a linkage system for loading the suspension element upon relative movement between the wheel and the frame. Each embodiment reduces unsprung weight by loading the suspension element from an intermediate portion of a link that is pivoted to a sprung portion of the motorcycle. In one embodiment of the invention, the linkage system is disposed so as to minimize bending forces on the wheel supporting element that would otherwise be encountered due to the castor angle.

15 Claims, 11 Drawing Figures

MOTORCYCLE SUSPENSION SYSTEM

BACKGROUND OF THE INVENTION

This invention relates to a suspension system for motorcycles and more particularly to an improved suspension system that permits the achievement of non-linear rates while maintaining a low weight, particularly as to the unsprung components, and which minimizes bending loads on the suspension elements.

The advantages of non-linear vehicular suspension systems have been well known for a period of years. Such suspension systems have particular utility in motorcycles that are intended for off the road racing. In such an application, the use of a non-linear suspension system can offer large degrees of suspension travel with effective damping at the end of the suspension stroke. Although non-linear suspension systems have been readily adapted to rear wheel suspension systems for motorcycles, the use of non-linear suspensions for motorcycle front wheels is not as wide spread. One difficulty in applying non-linear suspensions systems to the front wheels of a motorcycle is that the systems heretofore proposed have significantly increased the unsprung weight of the front wheel. Obviously, such an arrangement can deteriorate the handling of the motorcycle and its riding characteristics. Furthermore, if the system provides sufficient rigidity for the front wheel, it has been found that the internal sliding resistance for the suspension is so high that operation under light loads can be seriously hampered. That is, when operating over a surface that has only small surface irregularities, the hydraulic shock absorber employed in the suspension system may experience cavitation, aeration or the like so as to significantly deteriorate the ride and handling.

It is, therefore, a principal object of this invention to provide a non-linear suspension system, particularly adapted for use in motorcycles, that reduces the unsprung weight.

It is another object of this invention to provide a non-linear motorcycle suspension system that offers high rigidity and reduced unsprung weight.

In the suspension system for a motorcycle front wheel, it is the normal practice to position the steering axis so that it is at a castor angle. When tubular type suspension systems are employed in conjunction with front wheels having a castor angle, the loading on the front wheel tends to create a twisting or bending moment upon the tubular suspension system. The imposition of such bending forces causes substantial resistance to the suspension movement and can result in inferior handling. Although it has been proposed to employ a separate spring that acts upon the front wheel carrier to overcome these bending forces, the use of such springs tends to cause an oversteering effect when turning. Such additional springs complicate the suspension system and add significantly to the unsprung weight. Furthermore, the amount of the bending force can depend upon the actual position of the front wheel in its suspension travel and the springs heretofore employed for resisting these forces do not compensate for the difference in loading.

It is, therefore, a further objection of this invention to provide an improved front suspension system for a motorcycle.

It is yet another object of this invention to provide a telescopic motorcycle front suspension system in which bending forces on the telescopic elements is substantially reduced.

SUMMARY OF THE INVENTION

A first feature of this invention is adapted to be embodied in a suspension system for the wheel of a motorcycle or the like comprising a first sprung member and a second unsprung member supported for suspension movement relative to the first member along a line. A wheel is rotatably supported by the second member. A suspension element is also employed and means are incorporated for loading the suspension element upon movement of the first member relative to the second member along the line. The loading means comprises a first link that is pivotally connected to the first member, a second link that is pivotally connected to the second member and means for pivotally connecting the links to each other. Means are provided for operatively coupling one end of the suspension element to the first link between its pivotal connection to the first member and its pivotal connection to the other link.

Another feature of this invention is adapted to be embodied in a front suspension for a motorcycle or the like. Such a suspension system comprises a first member that is supported for steering movement and a second member that is supported for reciprocation relative to the first member along a line that is not perpendicular to the ground and which second member rotatably supports a wheel. A suspension element is also incorporated as are means for loading the suspension element upon relative movement between the members. In accordance with this feature of the invention, the loading means is constructed to apply a force component to the second member perpendicular to its line of movement and in a direction opposite to that exerted on the second member by forces applied vertically to the wheel for minimizing bending forces on the second member.

DETAILED DESCRIPTION OF THE PREFERRED EMBODIMENTS

Referring first to the embodiment of FIGS. 1 through 7, a front wheel suspension system for a motorcycle is identified generally by the reference numeral 11. Although both embodiments of the invention are described in conjunction with front wheel suspension systems for motorcycles, it is to be understood that certain features of the invention may be employed with motorcycle rear wheel suspension systems or, for that matter, with suspension systems for other types of vehicles.

Figure 1:
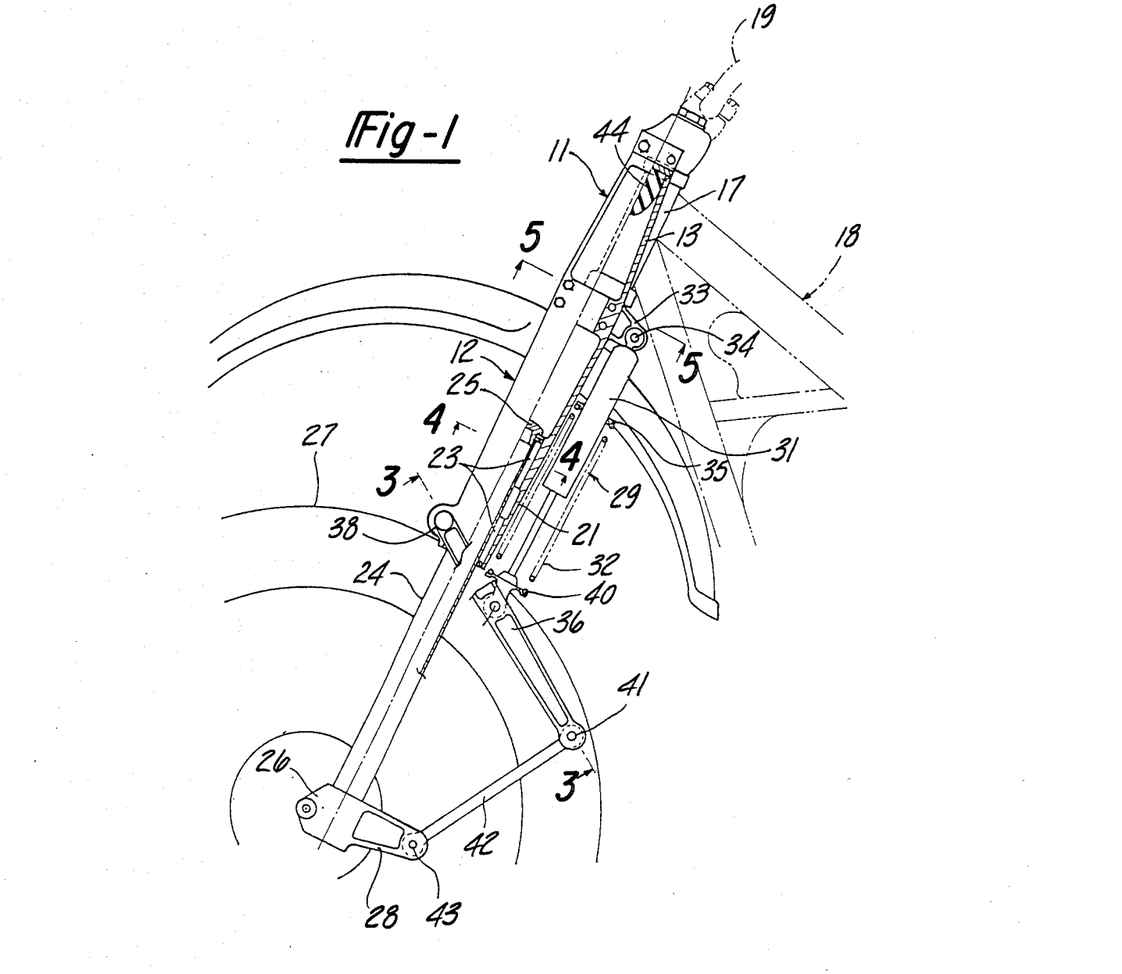
FIG. 1 is a side elevational view of a motorcycle front suspension system constructed in accordance with a first embodiment of the invention, with portions broken away and other portions shown in section.
Figure 2:
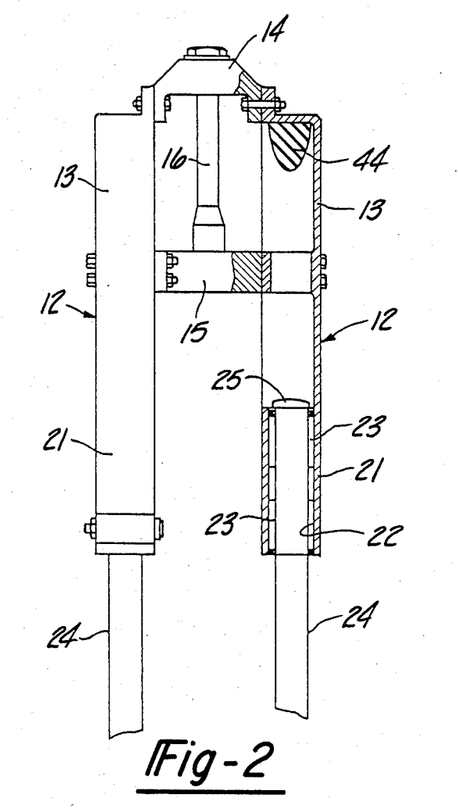
FIG. 2 is a front elevational view, with portions broken away and other portions deleted, of the embodiment of FIG. 1.
Figure 3:
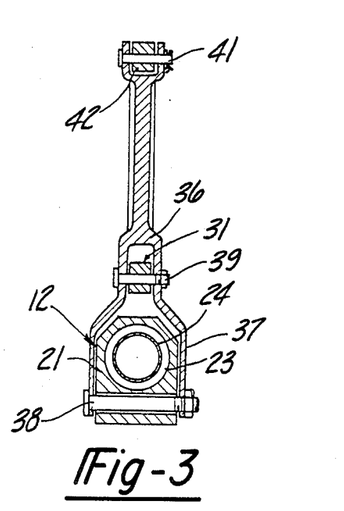
FIG. 3 is a cross-sectional view taken along the line 3—3 of FIG. 1.
Figure 4:
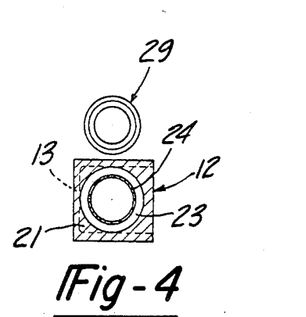
FIG. 4 is a cross-sectional view taken along the line 4—4 of FIG. 1.
Figure 5:
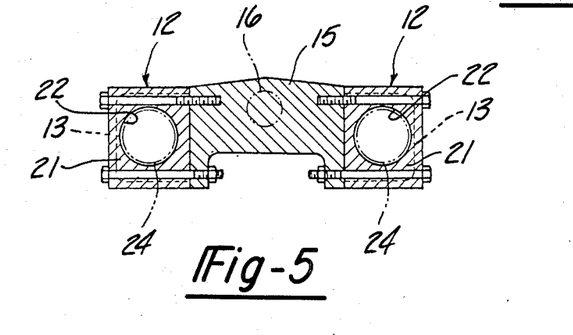
FIG. 5 is a cross-sectional view taken along the line 5—5 of FIG. 1.

The suspension system 11 includes a first, sprung member comprising a pair of transversely spaced apart front pillar assemblies, each indicated generally by the reference numeral 12. Since the front pillar assemblies 12 are substantially the same in construction, they have been each identified by the same reference numeral and the construction at only one side will be described in detail. The pillars 12 have upper sections 13 that have a generally C shaped cross-section and which face each other. The upper portions 13 are affixed to each other in spaced relationship by means of an upper bracket 14 and a lower bracket 15. The brackets 14 and 15 in turn carry a steering shaft 16 which is, in turn, journalled in a known manner in a head pipe 17 of a motorcycle frame assembly, indicated generally by the reference numeral 18 and shown primarily in phantom. A handlebar 19 is affixed in a suitable manner to the bracket 14 or some other component of the front fork assembly for steering of the pillars 12 about a steering axis defined by the shaft 16 and head pipe 17.

The pillars 12 have lower ends 21 that are generally solid and which define cylindrical openings 22. Bearings 23 are positioned in the openings 22 and slidably support the upper ends of a second unsprung member consisting of respective tubes 24. the tubes 24 have enlarged heads 25 at their upper ends which limit the rebound travel of the tubes 24 relative to the pillars 12.

Since as aforenoted, the construction of the front assembly on either side of the headpipe 17 is the same, only the construction at one side will be described in detail in the remaining portion of the description of this embodiment.

Each tube 24 carries a casting 26 at its lower end which, in turn, rotatably support a front wheel 27 in a known manner. The castings 26 have rearwardly extending projections 28.

A suspension element, indicated generally by the reference numeral 29, is positioned at each side of the front suspension arrangement. Each suspension element 29 includes a hydraulic shock absorbing assembly 31, of the piston type, and a surrounding coil compression spring 32. The cylinder end of the hydraulic shock absorbing unit 31 is pivotally connected to a rearwardly extending bracket 33 formed integrally with the pillar end 13 by means of a pivot assembly 34. The upper end of the spring 32 is affixed relative to the cylinder 31 in a known manner by means including a plate 35. The lower end of the suspension element 29 is loaded by means of a linkage system, now to be described.

A first link 36 has a bifurcated forward end 37 that encircles the pillar 12 and which is pivotally connected to an integral boss formed on the forward portion of the pillar lower end 23 by means of a pivot pin 38. An intermediate portion of the lever 36, contiguous to the bight of the bifurcated portion 37 is pivotally connected to the piston rod of the shock absorber 31 by means of a pivot pin 39 and loads the spring 32 through a cup 40. The trailing end of the link 36 is pivotally connected, by means of a pivot pin 41, to a rearward end of a second link 42. The opposite end of the second link 42 is pivotally connected to the casting extension 28 by means of a pivot pin 43.

When the front wheel 27 encounters an obstruction or when there is an extra load on the frame 18, the tubes 24 will slide upwardly relative to the pillars 12. Upon such movement, the links 42 and 41 will transmit the load to the suspension element 29 so as to resist this relative movement. A pair of elastomeric jounce or bump stops 44 are positioned at the upper ends of the pillar portions 13 to be contacted by the tube portions 25 so as to limit the maximum jounce travel.

Figure 6:
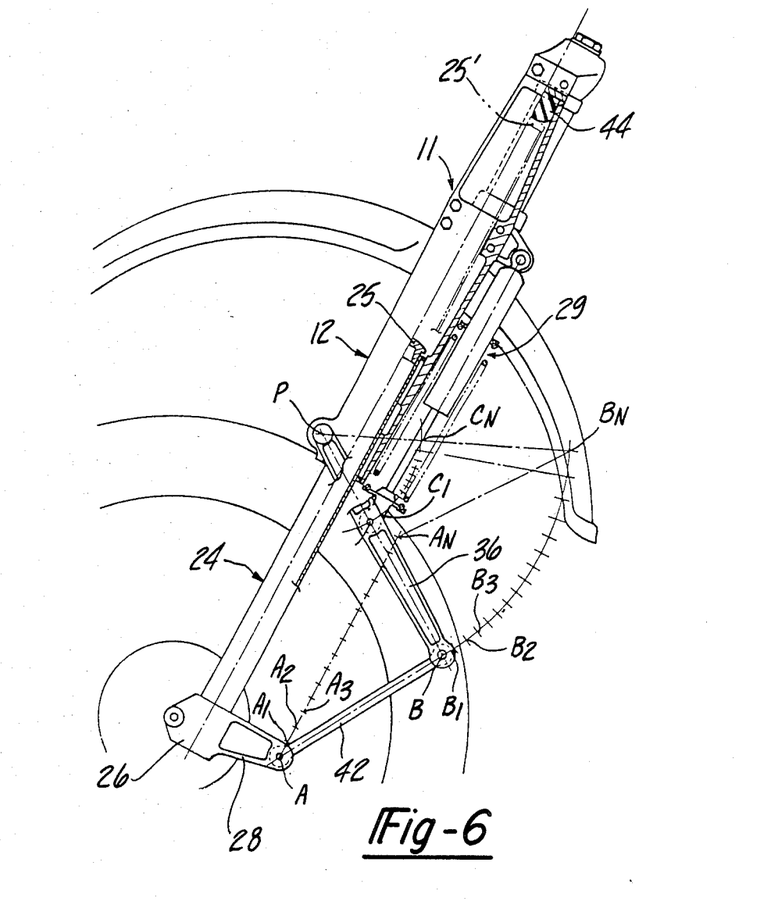
FIG. 6 is a side elevational view, with portions shown in section, similar to FIG. 1 and showing the geometric relationships.
Figures 7, 10:
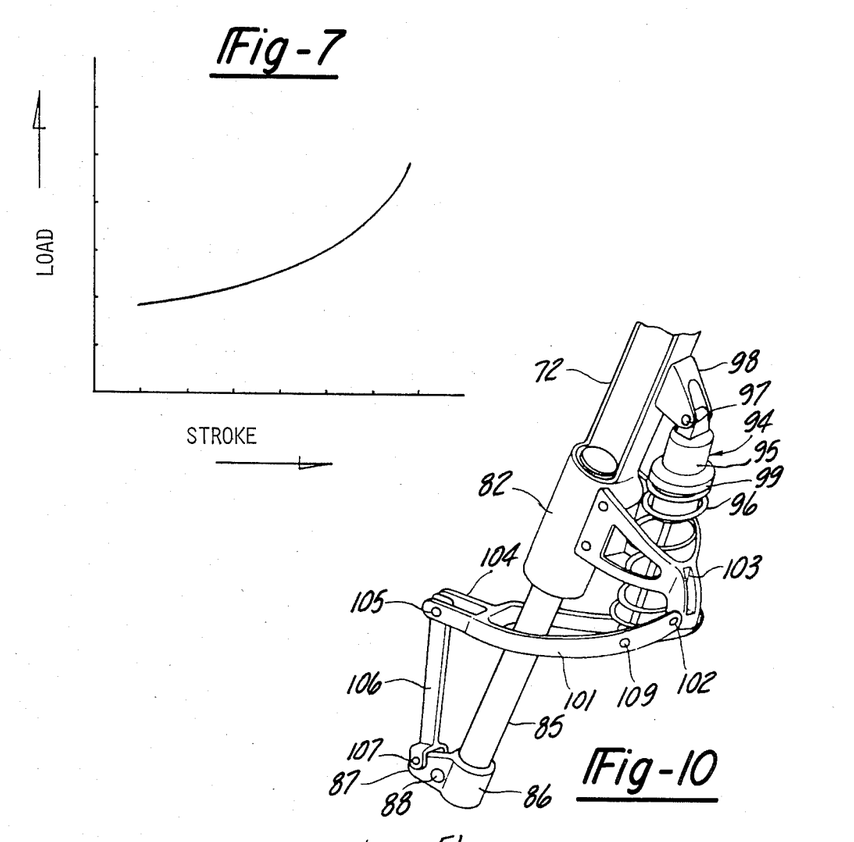
FIG. 7 is a graphical view showing the relationship of load to suspension travel of the embodiment of FIGS. 1 through 6.
FIG. 10 is a perspective view showing one side of the front suspension system of the embodiment of FIGS. 8 and 9.

FIGS. 6 and 7 illustrate the geometry of the suspension system 11. The pivotal connection between the lever 42 and the casting extension 27 provided by the pivot pin 43 is identified by the reference character A. The point A moves in unison with the wheel 27 and equal increments of movement are identified by the points $A_1$, $A_2$, $A_3$ ... $A_n$. The pivotal connection between the links 36 and 42 provided for by the pivot pin 41 defines a pivot axis identified by the character B. During suspension movement, the pivot axis B traverses an arc about a pivot axis P defined by the pivotal support for the link 36 by the pivot pin 38. The incremental movement of the pivot axis B in relation to movement of the pivot axis A is identified by the respective incremental distances $B_1$, $B_2$, $B_3$ ... $B_n$. The pivot axis between the suspension element 29 and the lever 36 provided for by the pin 39 is indicated by the point C. Again, incremental movements of this point are identified by the letters $C_1$ ... $C_n$.

As should be readily apparent from FIG. 6, a given incremental amount of movement of the wheel 27 causes the point A to move at the same increment. The pivot axis B, however, due to the geometry of the linkage system, moves at an increasing rate so that its final incremental travel is significantly greater than its initial incremental travel. The same is true with respect to the point C. As a result, a given load applied to the wheel 27 will cause the suspension element 29 to initially offer relatively soft resistance to relative movement due to the relatively smaller incremental movement of the point C. However, as the wheel 27 approaches the bounce stop 44, there will be a progressively increasing amount of movement of the point C and a substantially increased resistance to further travel will occur. This relationship is shown in FIG. 7 wherein the movement is shown with the stroke on the abscissa and the amount of load necessary to achieve this movement indicated on the ordinate. As a result, a relatively soft ride over minor loads will be accomplished and a progressively increased resistance to movement will occur at the end of the stroke. This permits greater suspension travels with better control than with prior art type constructions.

It should be understood that the actual shape of the curve shown in FIG. 7 can be varied by varying the geometry of the system. That is, the shape of this curve can be altered by changing the distances A-B, B-C and B-P. Also, the initial angle of the various links can be changed so as to change the shape of the curve as shown in FIG. 7.

Because of the relatively small movement of the shock absorber elements during light travels, there is an elimination of the likelihood of aeration or cavitation, particularly if a shock absorber of the DeCarbon type is employed. Handling is also significantly improved since the unsprung weight provided for by the disclosed suspension system is reduced from those wherein the suspension element is contained within the tubular portions of the tube 24 and pillar 11. The rearward location of the links 36 and 42 locates them in a protected area and also tends to shift the center of gravity rearwardly, particularly with respect to the steering axis so as to avoid the likelihood of oversteering during turning.

In this embodiment, two suspension arrangements are provided, one associated with each pillar 11 and tube 24. It should be understood that, if desired, a single suspension unit may be provided at only one side of the front wheel 27 so long as the system has sufficient ridigity. Also, rather than using an elastomeric jounce stop 44, an air cushion or the like can be used.

Although the embodiment of FIGS. 1 through 7 provides a highly effective suspension system, that is particularly adapted for use in connection with the front wheels of a motorcycle, there is another difficulty with such front suspension systems which is not solved by this embodiment. The difficulty will be described in conjunction with FIG. 11, wherein a conventional or prior art front wheel suspension system is shown schematically. The suspension system includes a front fork assembly, indicated generally by the reference numeral 51 and that has a pair of tubes 52 that support a pair of lower tubes 53 for reciprocating suspension movement by means of interposed bearings 54. A front wheel 55 is carried by the lower tubes 53 and rotates about an axis 56.

Figure 11:
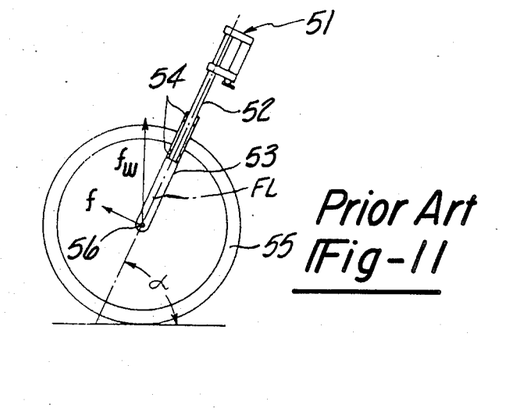
FIG. 11 is a side elevational view, partially in schematic form, showing the prior art type of front suspension arrangement in order to explain the advantages of the embodiments of FIGS. 8 through 10.

The tubes 52 and 53 are disposed so that the telescopic movement of the tube 53 relative to the tube 52 occurs along a line FL that is disposed at a castor angle $\alpha$ to the plane along which the wheel 55 is travelling. As is well known, such castor angles are employed so as to improve steering.

Figure 8:
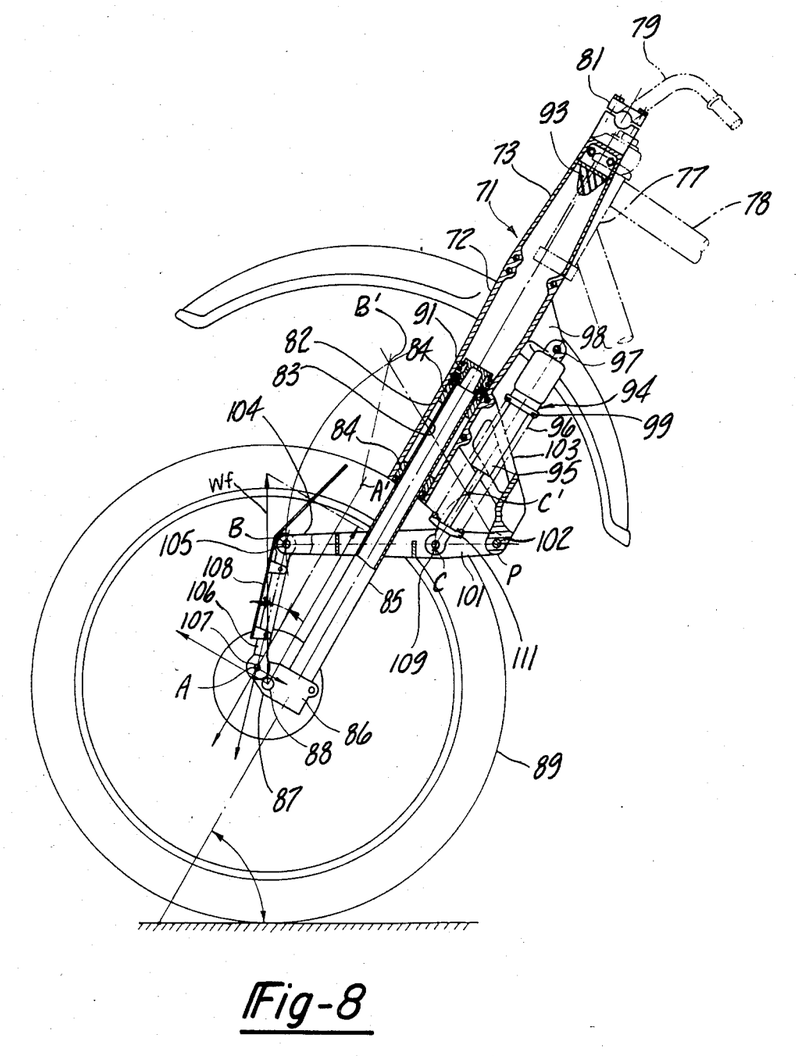
FIG. 8 is a side elevational view, with portions shown in section and other portions broken away, in part similar to FIG. 1, and showing another embodiment of the invention.

A force on the wheel 55 is exerted generally in a vertical direction as indicated by the force vector $W_f$. However, since the castor angle $\alpha$ is employed, the force $W_f$ does not act directly along the line of movement FL of the tube 53. Thus, the force $W_f$ consists of a component that acts along the line FL and a perpendicular component indicated by the vector f. It should be readily apparent from an inspection of FIG. 11 that the force vector f causes a bending or twisting movement on the tube 53 which tends to cause binding in the bearings 54 and resistance to the suspension movement of the wheel 55. The embodiment of FIGS. 8 and 10 is constructed so as to enjoy the non-linear rate of the embodiment of FIGS. 1 through 7 and also so as to generate a force that resists this twisting force.

Figure 9:
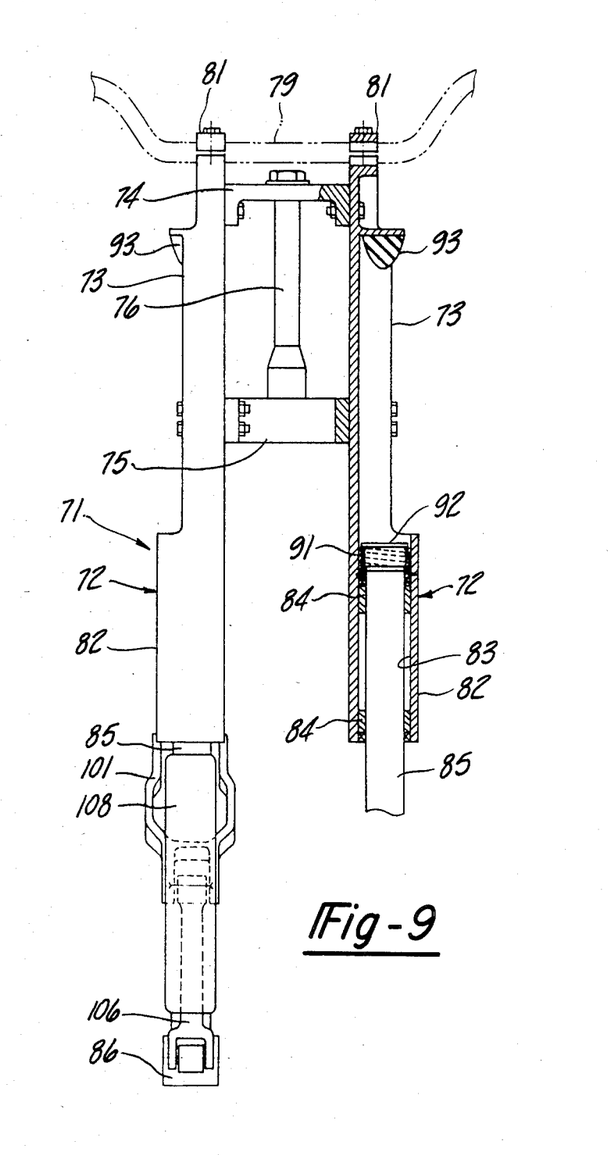
FIG. 9 is a front elevational view, with portions broken away and other portions deleted, of the embodiment of FIG. 8.

Referring now to this embodiment, a motorcycle front suspension system is identified generally by the reference numeral 71. The suspension system 71 includes a pair of pillar members 72 which, in accordance with this embodiment, have upper ends 73 that have generally C shaped cross-sectional configuration. In this embodiment, however, the C shape ends 73 face away from rather than toward each other as in the previously described embodiment. The upper ends 73 are affixed to each other by means of an upper bracket 74 and a lower bracket 75. A steering shaft 76 is connected between the brackets 74 and 75 and is rotatably journalled by a head pipe 77 of a frame assembly 78 in a known manner.

In accordance with this embodiment of the invention, a handlebar 79 is affixed directly to the pillars 72 by means of brackets 81 so as to further increase the rigidity of the front fork assembly. The pillars 72 have cylindrical lower ends 82 in which cylindrical bores 83 are formed. Bearings 84 are fit into the bores 83 and reciprocally support tubes 85. As with the preceding embodiment, the structure at each side of the steering shaft 76 is substantially the same. For that reason, only the structure at one side has been illustrated in detail and will be described. It is to be understood, except as hereinafter noted, the construction at each side is the same.

A casting 86 is affixed to the lower end of each of the tubes 85 and has a forwardly extending portion 87 that journals an axle 88 of a front wheel 89. The wheel 98 rotates about the axis defined by the axle 88 as is well known.

The figures show the suspension 71 in a full rebound condition. In this condition, a coil compression spring 91 (FIGS. 8 and 9) interposed between the uppermost bearing 84 and a head 92 affixed to each tubular member 85 resiliently limits the downward movement of the wheel 89 relative to the frame 78. A jounce stop 93 is positioned at the upper end of the pillar portions 73 and may be either an elastomeric element or an air spring or suitable element. The piston heads 92 are adapted to engage the jounce stops 93 so as to resiliently limit the maximum upward movement of the tubes 85.

A suspension element, indicated generally by the reference numeral 94, is positioned adjacent each pillar 72 for cushioning the movement of the wheel 89 and frame 78 relative to each other. As in the preceding embodiment, the suspension element 94 may comprise a hydraulic shock absorber 95 of the piston type and a surrounding coil compression spring 96. The cylinder end of the shock absorber 95 is affixed by means of a pivot assembly 97 to a rearwardly extending boss 98 formed integrally with the pillar 72. The upper end of the coil spring 96 is affixed against movement relative to the cylinder of the shock absorber 95 in a suitable manner, as by means of a retainer 99.

As with the previously described embodiment, a linkage assembly is incorporated for loading the suspension element 94 in a non-linear fashion upon movement of the wheel 89 relative to the frame 78. As has been aforenoted, this linkage system is designed so as to provide a force component at the lower end of the tubes 85 that tends to minimize the bending forces exerted on the tubes 85.

The linkage system includes a first link 101 that is bifurcated at its rear end and which is connected by means of a pivot pin 102 to a bracket 103 that is either affixed to or formed integrally with the pillar lower portion 82.

The bifurcated portion of the lever 101 encircles the tube 85 and extends forwardly from the pivot pin 102 to a further bifurcated end portion 104. The end portion 104 is connected by means of a pivot pin 105 to the upper end of a second link 106. The lower end of the link 106 is bifurcated and is connected by means of a pivot pin 107 to the casting extension 87 at a point forwardly of the axle 88. In view of the forward placement of the link 106 and the forward end 104 of the link 101, these portions are protected by a plate 108 that is affixed in a suitable manner to the link 106.

The piston rod of the shock absorber 95 is connected to the link 101 by means of a pivot pin 109. The pivot pin 109 is disposed between the pivot pins 102 and 105 and rearwardly of the tubes 85. The shock absorber rod is affixed to a carrier 111 which in turn engages the underside of the spring 96 so as to load the spring 96 upon suspension travel.

The linkage system that loads the suspension element 94 is constructed, as in accordance with the preceding embodiment, so as to achieve a non-linear suspension rate. That is, initial deflections of the wheel 89 are resisted at a relatively low rate while continued suspension travel increases the rate of the suspension system so as to permit a greater overall suspension travel and to minimize the shocks encountered when the tube 85 goes to its full jounce position. In addition to these advantages, the link 106 is disposed at an angle $\beta$ to a line that is parallel to the line of movement FL of the tube 85. This line is the line along which the point A (pivot axis of link 106 to casting extension 87) travels.

As has been previously noted, the imposition of a force $W_f$ on the wheel 89 acts in a vertical direction whereas the point A and tube 85 move along lines that are non-vertical due to the castor angle $\alpha$. Hence, a force component indicated by the vector f is exerted on the lower end of the tubes 85 that tends to cause a bending or twisting force. This force can cause wear in the bearings 84 and further hinder the suspension movement.

The force on the wheel $W_f$ is, however, resisted by a force exerted by the suspension element 94 which, in turn, acts on the casting 86 along the line of the link 106 interconnecting its pivot points A and B. This spring force is indicated by the vector $W_s$. This vector is not parallel to the line FL and, therefore, exerts a perpendicular force component indicated by the vector f' acting along the line FL, and resisting the twisting force f. Therefore, the amount of the twisting force is reduced by virtue of this suspension arrangement.

Because of the geometry of the linkage, the point B travels through an arc as indicated in FIG. 8 during increased suspension travel. Hence, as the suspension is deflected, the angle $\beta$ will actually increase so as to increase the anti-twisting force component f' and further reduce the likelihood of binding of the tube 85 in the bearings 84. Also, as has been noted above, the force on the spring 96 increases at a non-linear rate during increased suspension travels so as to further reduce these binding forces.

It should be readily apparent from the foregoing description that each embodiment of the invention provides an extremely compact and yet highly effective non-linear suspension system. Furthermore, one embodiment of the invention also has its components oriented in such a way as to reduce twisting forces exerted upon the sliding suspension elements. Although two embodiments of the invention have been specifically illustrated, various changes and modifications may be made by those skilled in the art without departing from the spirit and scope of the invention, as defined by the appended claims.

I claim:

1. In a suspension system for the wheel of a motorcycle or the like comprising a first sprung member, a second unsprung member supported for suspension movement relative to said first member along a line, a wheel rotatably supported by said second member, a suspension element having opposite ends and means for loading said suspension element upon movement of said first member relative to said second member along said line comprising a first link pivotally connected to said first member, a second link pivotally connected to said second member, means for pivotally connecting said links to each other and means for connecting one end of said suspension element to said first link between its pivotal connection to said first member and its pivotal connection to said second link for loading said suspension element upon relative movement between said members.

2. In a suspension system as claiemd in claim 1 wherein the other end of the suspension element is operatively connected to a sprung member of the motorcycle.

3. In a suspension system as claimed in claim 2 wherein the other end of the suspension element is connected to the first member.

4. In a suspension system as claimed in claim 3 wherein the suspension element is positioned to the rear of the first member so as to be protected thereby.

5. In a suspension system as claiemd in claim 4 wherein the suspension element comprises a piston type shock absorber and a coil spring.

6. In a suspension system as claimed in claim 1 wherein the first and second links are positioned to the rear of the first and second members so as to be protected thereby.

7. In a suspension system as claimed in claim 6 wherein the pivotal connection between the links and the respective members lies at one end of the links, the pivotal connection between the links being positioned at the other ends of said links.

8. In a suspension system as claimed in claim 7 wherein the first and second members are telescopic for relative sliding movement.

9. In a suspension system as claimed in claim 1 wherein the suspension element is positioned to the rear of the first member so as to be protected thereby.

10. In a suspension system as claimed in claim 9 wherein at least one of the links is positioned to the front of the members.

11. In a suspension system as claimed in claim 10 wherein the second link is positioned to the front of the second member and the first link extends from a pivotal connection disposed at the rear of the first member to a point forwardly of the second member wherein it is pivotally connected to the second link.

12. In a suspension system as claimed in claim 11 further including a protective plate affixed to the second link and lying in front thereof and extending upwardly beyond the first link to protect the forwardly extending portion of the second link and the first member.

13. In a front suspension system for a motorcycle or the like comprising a first member supported for steering movement, a second member supported for reciprocation relative to said first member along a line that is not perpendicular to the ground, a wheel rotatably supported by said second member, a suspension element, and means for loading said suspension element upon relative movement between said members, the improvement comprising said loading means being constructed to apply a force component to said second member perpendicular to said line and in a direction opposite to that exerted on said second member by forces applied vertically to said wheel for minimizing bending forces upon said second member.

14. In a front suspension system as claimed in claim 13 wherein the loading means comprises a first link pivotally connected to the first member, a second link pivotally connected to the second member and means pivotally connecting said links to each other.

15. In a front suspension system as claimed in claim 14 wherein the second link is disposed at an angle to the line for generating the first component to the second number in a direction perpendicular to the line.

* * * * *